(No Model.) 2 Sheets—Sheet 2.
E. PRIEST.
TOOL FOR REDRESSING CRANK PINS OF LOCOMOTIVE WHEELS.

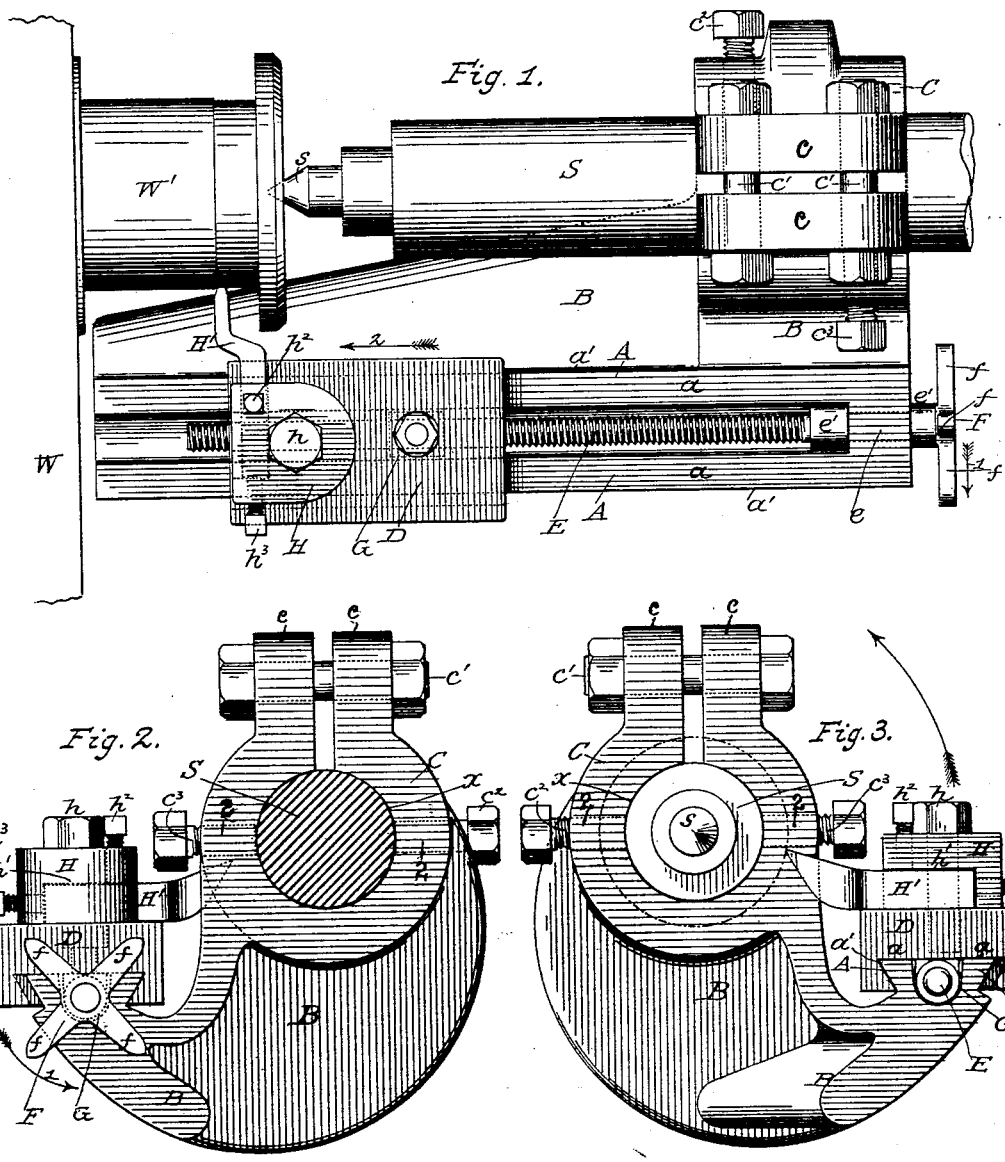

No. 586,244. Patented July 13, 1897.

Witnesses.

Edwin Priest,
Inventor by Alex. Selkirk
attorney

UNITED STATES PATENT OFFICE.

EDWIN PRIEST, OF BATH-ON-THE-HUDSON, NEW YORK.

TOOL FOR REDRESSING CRANK-PINS OF LOCOMOTIVE-WHEELS.

SPECIFICATION forming part of Letters Patent No. 586,244, dated July 13, 1897.

Application filed March 27, 1896. Serial No. 585,050. (No model.)

*To all whom it may concern:*

Be it known that I, EDWIN PRIEST, a citizen of the United States, residing at Bath-on-the-Hudson, in the county of Rensselaer and State of New York, have invented new and useful Improvements in Tools for Redressing or Re-Turning Crank-Pins of Locomotive-Wheels and of Cranks of Fly-Wheels of Engines, of which the following is a specification.

My invention relates to a tool for redressing or re-turning crank-pins while in place in the wheel or crank which is to be revolved; and it consists in the combination of devices and elements hereinafter described, and set forth in the claim.

The object of my invention is to provide a tool calculated to be secured with a revolving spindle (of a lathe) having a center pin adapted to center in the usual countersunk center hole provided in the crank-pin to be redressed, so as to revolve with said spindle and carry in a true circle about the crank-pin a cutting-tool capable of being gradually fed forward in direction transverse to the axis of the crank-pin and also be automatically moved in direction of the length of the crank-pin, whereby the cutting-tool may be made to progressively remove from the crank-pin all radially-projected inequalities of the periphery of the same and gradually reduce its irregularly or worn oval form of surface to a true circular form. I attain this object by the means illustrated in the accompanying drawings, forming a part of this specification, in which—

Figure 4:
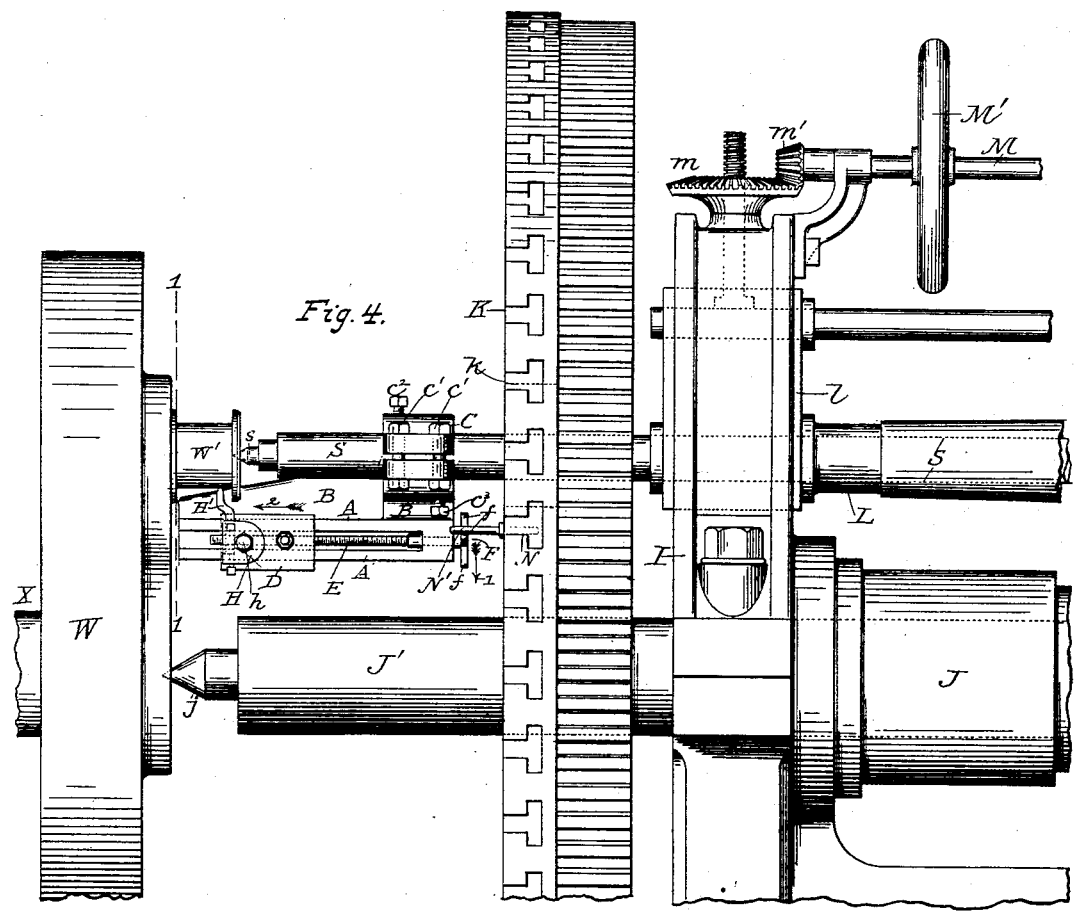
Figure 5:
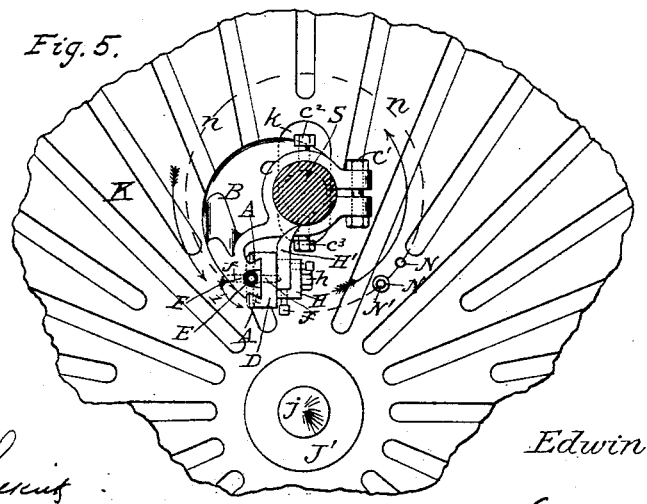

Figure 1 is a plan view of my improved tool and illustrates the same secured to a revolving spindle and being operated for redressing a crank-pin. Fig. 2 is an end view of the tool from its sleeve end. Fig. 3 is a view of the same from its opposite end. Fig. 4 is a side elevation of a lathe (a part thereof) and a locomotive driving-wheel having in it a crank-pin to be redressed or re-turned, together with my improved tool, on a smaller scale, in place and in connection with the quartering-spindle of the lathe and illustrating the tool when in operation; and Fig. 5 is a view in the transverse taken at line 1 in Fig. 4 and looking toward the face-plate of the lathe.

It is well known that crank-pins of locomotive drive-wheels and fly-wheels, orignally made with a true circular form, become by use worn to an oval form and also irregular in direction of their length and require from time to time to be redressed or re-turned. This has heretofore been done in some cases in an ordinary lathe after the wrist-pin has been removed from its wheel or crank, in other cases by means of a hand-tool centered from the periphery of a carefully-turned supplemental ring applied temporarily to the circumference of the inner collar of the crank-pin close to the metal of the wheel, and also held clamped to the same while the tool would be revolved by hand by one person at the same time another was required to feed the cutting-tool forward, after which it was required to finish the work by dressing the peripheral surface of the pin with a file. Tools driven by power and carried by lathes specially constructed for operating a tool have also been employed for the same purpose; but these old methods in all cases have been expensive and involved the exercise of great skill and care and an expenditure of considerable time and attendance of at least two persons, while an absolutely true and finished circular form similar to its original form could not be reproduced in these worn crank-pins by any of these old methods except at great expense.

In the drawings illustrating my invention similar letters of reference refer to similar parts throughout the several views.

In the drawings, A A are parallel ways of a tool-carriage. B is a bracket which carries the said ways, which latter may be secured to said bracket by bolts, (not shown,) yet I prefer to make the said ways integral with the bracket, as shown in Figs. 2, 3, and 5.

C is a sleeve preferably made integral with the thickest end portion of bracket B. This sleeve is arranged in such relation with the ways A that their face-surfaces $a\,a$ and edge surfaces $a'\,a'$ are relatively parallel with the axial line of the bore $x$ of the sleeve while setting off laterally to a short distance from the said ways for allowing a tool-carriage riding on said ways to be moved over the full length in either direction. For convenience for effecting a secure attachment of the sleeve C to a revolving spindle which may be adapted to carry this tool I use a sleeve of the class known as a "clamping" or "split" sleeve, and give to the bore $x$ of the same a diameter which about corresponds with the diameter of the spindle S to be received and clamped by it. This sleeve C (shown to be split) has its lugs $c\ c$ perforated to receive clamping-bolts $c'\ c'$, by which the sleeve may be tightly clamped on the spindle S. Set-screws $c^2\ c^3$, screwing into the opposite side of the sleeve, are provided for effecting, when required, an adjustment of the tool, so that the axial line of the bore of the sleeve when on the spindle S will be coincident with the axial line of the crank-pin to be returned. One of these set-screws, as $c^3$, is at near the rear end of the sleeve, and the other, as $c^2$, at near the forward end of the same and are so run through the respective portions of the sleeve that their axial lines are transverse to the axial line of the bore of the same, as illustrated by dotted lines 2 in Figs. 2 and 3.

D is a tool-carriage mounted on the ways A, and E is a feed-screw revolving in a groove sunken between the ways A and held from moving longitudinally in either direction by bearing $e$, connected with said ways and holding with the shoulders $e'\ e'$ of the journal of said feed-screw.

F is a feed device comprising a series of arms $f$, secured to the head end of the shaft of the feed-screw E for revolving the same.

G is a screw-threaded sleeve secured with the tool-carriage D from its lower side, and receiving the feed-screw E, which freely works therein when it is revolved in either direction. When the screw-thread of this feed-screw is right-hand, a revolution of the same in direction of arrows 1 will cause the tool-carriage to be moved in direction of arrows 2, and a reversed revolution of said feed-screw reverses the direction of movement of the said tool-carriage.

H is a cutting-tool holder secured to said carriage D, preferably by means of the screw-bolt $h$.

H' is a cutting-tool of any suitable form of construction for use for cutting the metal of the crank-pin for redressing or re-turning the same. In the forward side of this tool-holder H is provided a recess $h'$ (shown by full lines in Fig. 3 and by dotted lines in Figs. 1, 2, and 4) for receiving said cutting-tool H'.

$h^2$ is a set-screw for holding the cutting-tool from moving after being set and adjusted, and $h^3$ is a feed-screw by means of which an operator may, by use of a suitable instrument, move the cutting-tool forward, as may be desired, when the set-screw $h^2$ is slackened slightly off said tool when the cut of the metal is to be deepened.

This tool, comprising the parts above described, may be operated by any suitable spindle, as S, when secured within sleeve C, so as to be securely held from turning in relation to it, and it may be nicely adjusted in relation to the crank-pin to be operated with by providing, as I do, the spindle S with a center $s$, which enters the countersunk central depression originally provided in the outer end of the crank-pin W', as indicated by dotted lines in Figs. 1 and 4.

Although this tool may be used in connection with any large lathe with which machine-shops are generally equipped for turning up wheels of large diameter, yet I prefer to use it with lathes generally employed in railroad machine-shops for re-turning the tires of driving-wheels of locomotives, which lathe (a part thereof) is illustrated in its side elevation in Fig. 4 and the face-plate thereof in Fig. 5. In this preferred form of lathe I is one of the two end standards thereof, in which standards is supported mandrel J, carrying spindle J', provided at its outer end with a center $j$.

K is the face-plate, mounted on said spindle so as to be revolved with it when the latter is revolved by the usual actuating mechanism. (Not shown.) An oblong perforation through the face-plate, as perforation $k$, Fig. 5, is provided for reception of the spindle S.

L is a second mandrel having its bearings in suitable boxes $l$, provided in the end standards I, and adapted to be revolved by actuating mechanism (not shown) and having secured in its hollow end toward the face-plate the quartering-spindle S, which is removable therefrom at will. This mandrel L is mounted in boxes $l$, adapted to be vertically by any suitable mechanism, as generally provided, and preferably by bevel gear-wheels $m\ m'$, shaft M, and hand-wheel M', all of which parts are so well known that a particular description thereof is unnecessary. Provided in face-plate K are perforations N, one or more, at points in a circular line, (indicated by dotted lines $n$,) which line will be in correspondence with the line of travel of the feeding device F at the outer end portion of its arms $ff$.

N' is a feed-pin inserted in one of the perforations N, and duplicate feed-pins (not shown) may be inserted in the other perforations N, as may be required or preferred for operating successively with each arm $f$, as may be required for revolving the feed-screw E in the distance required for feeding, through the tool-carriage D, the cutting-tool H in direction of the length of the crank-pin for removal of the chip.

The manner in which my above-described tool is placed and operated is as follows: The quartering-spindle S is passed through the perforation $k$, Fig. 5, in the face-plate K and into the bore of the mandrel L and secured therewith, the revolution of the face-plate being stopped. The sleeve C of the tool is then passed on the spindle S up to the face-plate. The driving-wheels W, in pairs, (one not shown,) mounted on their axle X, are then swung between the usual centers $j$ of the spindles J', (one shown,) the said centers $j$ entering the usual central countersink in one end of the axle X, as shown in Fig. 4, with a similar center (not shown) entering the opposite end central countersink in the opposite end of the axle. The wheel W is then turned on its supporting-centers until the crank-pin W' is brought opposite the center s of said spindle, and by moving the wheel W in a suitable direction and at the same time lowering or raising the mandrel L carry the spindle S to the position required, whereby the center s of said spindle may be introduced directly and centrally into the central countersink in the end of the crank-pin W', so as to hold with the same. The tool will then be adjusted in place on spindle S by moving its sleeve C to its required place on the former and then operating the set-screws $c^2$ $c^3$ so that the axial line of the bore of the sleeve C may be brought to be coincident with the axial line of the crank-pin. The clamping-bolts $c'$ $c'$ will then be tightened on the lugs of the split sleeve C and thereby cause the sleeve to tightly clamp the spindle S. The tool-carrier will then be adjusted to the crank-pin, with its cutting-tool H' in place between the shoulders of the same, and preferably at the shoulder of the outer end button of said crank-pin, ready to be set forward for cutting. The feed-pins N', one or more, are then inserted in the perforations N in the face-plate. The operator will with a suitable wrench turn the feed-screw $h^3$ in a proper direction for moving the cutting-tool H' forward to the required or preferred distance for cutting to the depth desired by the operator the clip to be taken off the crank-pin. The mandrel L, with spindle S, will now be revolved in the proper direction by the usual actuating mechanism, (not shown,) when the tool will be revolved in a circle about the crank-pin, as indicated by arrows 3 in Fig. 5, and thereby carry the cutting-tool H' in a circular direction around the crank-pin with its cutting edge cutting the desired clip from the periphery of the same. At each revolution of the spindle and the tool secured thereon the feeding device F will in its circular line of movement be carried on the line of dotted line $n$, Fig. 5, at which the one or more pins N' are placed on the face-plates, so that one or more of the arms $f$ of the feeding device F may strike said pin or pins N and thereby revolve the feed-screw E one-quarter or more of a revolution, as may be preferred, when the tool-carriage will carry the cutting-tool H' the distance desired in direction of the length of the crank-pin. These operations of the pins N' with the arms $f$ of the feeding device will be continued until the cutting-tool has been moved the entire length of the crank-pin, when the cutting-tool may be carried back to its place of beginning a new cut, and with like operations one or more cuts may be taken from the periphery of the crank-pin until it has been brought to a true cylindrical form similar to that it originally had.

Having described my invention, what I claim, and desire to secure by Letters Patent, is—

In a tool for redressing crank-pins, a bracket provided with a split sleeve and ways, integral therewith in combination with a revolving spindle, clamping-bolts adapted to clamp the divided portions of the sleeve tightly on the revolving spindle, and set-screws $c^2$ $c^3$ for adjusting the ways in relation to the axial line of the said spindle as may be found necessary, substantially as and for the purposes set forth.

EDWIN PRIEST.

Witnesses:
CHARLES SELKIRK,
A. SELKIRK, Jr.